United States Patent [19]

Panaccione

[11] 4,208,448
[45] Jun. 17, 1980

[54] METHOD FOR IMPROVING THE PERFORMANCE OF LOW PRESSURE FLUORESCENT DISCHARGE LAMP WHICH UTILIZES ZINC SILICATE AS A PHOSPHOR BLEND CONSTITUENT

[75] Inventor: Elmer S. Panaccione, North Arlington, N.J.

[73] Assignee: Westinghouse Electric Corp., Pittsburgh, Pa.

[21] Appl. No.: 955,870

[22] Filed: Oct. 27, 1978

[51] Int. Cl.² .......................... H01J 61/02; H01J 9/22
[52] U.S. Cl. ...................................... 427/67; 427/106; 427/220; 427/230; 427/309; 313/487; 252/301.6 R; 29/25.11
[58] Field of Search ................ 427/67, 220, 309, 106, 427/230; 313/487; 252/301.6 R; 29/25.11

[56] References Cited

U.S. PATENT DOCUMENTS

| | | | |
|---|---|---|---|
| 3,165,476 | 1/1965 | Wachtel | 252/301.65 |
| 3,303,042 | 2/1967 | Reed | 427/67 |
| 3,649,329 | 3/1972 | Taubner | 427/67 |
| 3,757,938 | 9/1973 | Wachtel | 427/212 |
| 3,858,082 | 12/1974 | Thornton | 313/487 |

Primary Examiner—Michael F. Esposito
Attorney, Agent, or Firm—R. S. Lombard

[57] ABSTRACT

A method of improving the long term operating appearance of a low pressure fluorescent discharge lamp having an elongated tubular vitreous envelope and incorporating a phosphor layer carried as a coating on the interior surface thereof. The phosphor layer essentially consists of a mixed homogeneous three-component blend. The phosphor blend has a blue-violet-emitting phosphor component, a red-orange-emitting phosphor component and a green-emitting phosphor component. The green-emitting phosphor component is zinc silicate activated with manganese. The method entails prior to mixing the phosphors together, washing the zinc silicate phosphor in an aqueous organic acid solution. The organic acid solution consists of at least one of acetic, succinic and terephthalic. The acid washed zinc silicate phosphor is separated from the washing solution and dried. It is then suspended as a part of an aqueous envelope coating paint and applied to the envelope interior surface in the usual manner.

5 Claims, 1 Drawing Figure

U.S. Patent        Jun. 17, 1980        4,208,448
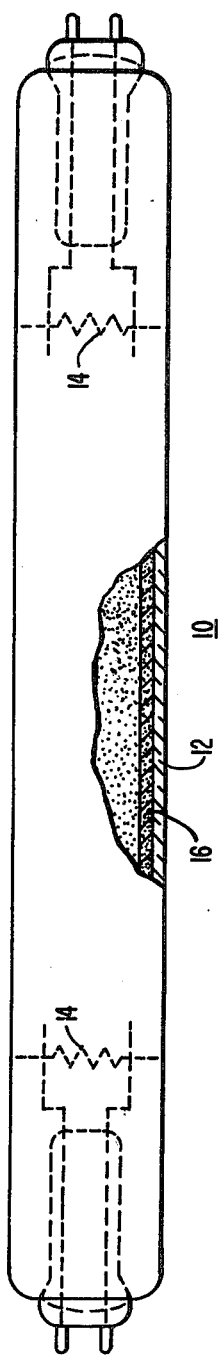

METHOD FOR IMPROVING THE PERFORMANCE OF LOW PRESSURE FLUORESCENT DISCHARGE LAMP WHICH UTILIZES ZINC SILICATE AS A PHOSPHOR BLEND CONSTITUENT

BACKGROUND OF THE INVENTION

The invention relates to low pressure fluorescent discharge lamps, and more particularly, to a method for improving long-term operating appearance of a low pressure discharge lamp which utilizes a mixture of a homogeneous three component phosphor blend carried as a layer on the interior surface of the lamp envelope. The phosphor blend substantially comprises a blue-violet-emitting phosphor component, a red-orange-emitting phosphor component, and a green-emitting phosphor component which is zinc silicate activated with manganese.

In U.S. Pat. No. 3,858,082 dated Dec. 31, 1974, issued to William A. Thornton, Jr. there is disclosed a fluorescent lamp that generates three narrow emissions in specific blue, green and red regions of the spectrum. This lamp generates composite radiations of a "white" color very efficiently and with excellent color rendition of illuminated objects. The overall performance of these lamps is excellent and they have received wide acceptance in applications such as department and specialty stores, an example being fabric stores, where the need for excellent color rendition of illuminated objects is apparent. In some limited cases, however, the "green emitting" phosphor component of the blend has displayed a somewhat poorer so-called maintenance of light emission than the other phosphor components at locations proximate the ends of the envelope appearing "pink" as compared to the rest of the operating lamp, as viewed directly. While this has not impaired the overall lamp performance as a source of illumination for objects, some users object to any pink appearance of the end portions of the envelope of the operating lamp.

Application of a phosphor coating to the interior surface of a fluorescent lamp envelope is well known in the art. For example, U.S. Pat. No. 3,303,042 dated July 2, 1962 issued to Reed et al., discloses a method of applying a phosphor coating of uniform thickness to the interior surfaces of a fluorescent lamp envelope of irregular crosssectional shape by means of an aqueous suspension phosphor and a water soluble polymer.

Washing phosphors is known in the prior art as a method for improving lamp maintenance. For example, in U.S. Pat. No. 3,757,938 issued to A. Wachtel dated Sept. 11, 1973, there is disclosed a method of sizing a zinc-magnesium silico-germanate phosphor to remove the ultra-fine particles to improve the performance of a discharge lamp comprising suspending the finely-divided prepared phosphor in an aqueous solution of ionizable aluminum compound or diethylene triamine pentacetic acid chelating agent, then settling the phosphor and removing the ultrafine particles which remain suspended. Another example is given in U.S. Pat. No. 3,165,476, issued to A. Wachtel, dated Jan. 12, 1965, which discloses a method for processing fired, finely-divided, copper-activated Group IIB metal sulfide electroluminescent phosphor in order to improve the brightness and efficiency of the phosphor. The method entails washing the phosphor in a solution which is a good solvent for Group IIB metal sulfide for a sufficient period of time to lighten the body color of said phosphor, additionally washing the phosphor in a 5% to 15% by weight hydrogen peroxide aqueous solution for a period of at least 30 minutes and not exceeding such time as will permit a substantial portion of the phosphor to dissolve, and thereafter removing from the phosphor any residual hydrogen peroxide washing solution.

SUMMARY OF THE INVENTION

The invention provides a method of improving the long term operating appearance at the envelope end portions of a low pressure fluorescent discharge lamp of the type which incorporates zinc silicate as a phosphor blend constituent. The lamp has an elongated tubular light transmitting vitreous envelope having electrodes operatively positioned proximate the envelope ends and enclosing a discharge sustaining filling comprising mercury and inert ionizable starting gas enclosed by said envelope. The envelope has a phosphor layer on the envelope interior surface which essentially consists of a homogeneous three-component phopshor blend. The phosphor blend has a blue-violet-emitting phosphor component, a red-orange-emitting phosphor component and a green-emitting phosphor component. The green-emitting phosphor component is zinc silicate activated by manganese.

The method comprises treating or conditioning the zinc silicate component prior to its being blended with the blue-violet-emitting phosphor component and the red-orange-emitting phosphor component. In accordance with this method, the zinc silicate phosphor component is washed in an aqueous organic acid solution, wherein the organic acid consists of at least one of acetic, succinic and terephthalic. The acid washed zinc silicate phosphor component is then separated from the acid washing solution and dried.

The dried separated zinc silicate phosphor component is suspended as a part of an aqueous envelope coating paint which includes suitable binder material, the washed zinc silicate phosphor component, the red-orange-emitting phosphor component and the blue-violet-emitting phosphor component, with the relative proportions of the phosphor components being those as desired in the completed lamp. The coating paint is applied to the envelope interior surface and the aqueous vehicle is subsequently volatilized along with the residual binder material from the applied paint, leaving the phoshpor component blend as a homogeneous layer on the envelope interior surface. Thereafter the lamp fabrication is completed.

BRIEF DESCRIPTION OF THE DRAWING

The sole FIGURE is an elevation partly in section of a low pressure fluorescent discharge lamp showing the phosphor layer carried on the interior surface of the lamp envelope.

DESCRIPTION OF THE PREFERRED EMBODIMENTS

With reference to the sole FIGURE, there is shown an elevational view, partly in section, of a low pressure fluorescent discharge lamp 10 which is improved in accordance with the present method. The lamp 10 has an elongated tubular vitreous envelope 12 having electrodes 14 operatively positioned proximate the ends thereof. The envelope 12 encloses a discharge sustaining filling comprising mercury and inert ionizable starting gas as is well known in the art. The envelope 12 has on the interior surface thereof a phosphor layer 16 consisting essentially of a mixed homogeneous three-component blend.

As is well known in the art; a low pressure mercury discharge produces mercury resonance radiation which has a significant ultraviolet component. In a fluorescent lamp it is this ultraviolet component, primarily at 254 nanometers, which energizes the mixture of phosphors to a visible light generating condition. Other methods of energizing the mixture of phosphors, such as high pressure mercury discharges, can also be used.

The phosphor blend has a blue-violet-emitting phosphor component, a red-orange-emitting phosphor component and a green-emitting phosphor component. The blueviolet-emitting phosphor normally consists of at least one of strontium chloroapatite activated by divalent europium which is preferred, alumino silicate activated with divalent europium, and calcium-barium-magnesium silicate activated with divalent europium. The red-orange-emitting phosphor normally consists of at least one of yttrium oxide activated with trivalent europium which is preferred, lithium indate activated with trivalent europium, and yttrium phosphate vanadate activated with trivalent europium. The green-emitting phosphor is zinc silicate activated with manganese.

The method entails prior to blending the zinc silicate phosphor with the blue-violet-emitting phosphor and the red-orange-emitting phosphor, washing the prepared zinc silicate phosphor in an aqueous organic acid solution having a molarity of from about 0.09 to 1.05, wherein the organic acid consists of at least one of acetic, succinic and terephthalic. The acid washed zinc silicate phosphor is separated from the washing solution. The separated zinc silicate phosphor is dried and suspended as a part of an aqueous envelope coating paint which includes suitable binder material such as hydroxyethyl cellulose, the separated zinc silicate phosphor, the red-oarange-emitting phosphor, and the blue-emitting phosphor, with the relative proportions of the phosphors being those as desired in the completed lamp. The coating paint is applied to the interior surface of the envelope 12. The aqueous vehicle and residual binder material is then volatized from the applied paint, leaving the phosphor blend as the homogeneous layer 16 on the envelope interior surface. The lamp fabrication is then completed by the usual steps of sealing in the mounts, exhausting, gas and mercury filling, sealing and basing.

EXAMPLE

The aqueous organic acid solution is prepared in the case of the acetic acid as a 200 ml aqueous solution having a molarity of 0.7 M. In the case of the succinic acid a 200 ml aqueous solution is prepared having a molarity of 0.32 M. In the case of the terephthalic acid, a 0.025 molar solution is prepared by dissolving 0.05 mole of terephthalic acid in 50 ml of a 25% solution of ammonium hydroxide, which is then diluted with water to 200 ml. Two-hundred grams of the zinc silicate phosphor to be washed is then added to any of the foregoing solutions. The zinc silicate solution is placed in a ball mill and milled for about thirty minutes to thoroughly wash the zinc silicate phosphor. The acid washed zinc silicate phosphor is then separated from the acid washing solution with a vacuum filter, without further water washing the phosphor. The separated zinc silicate phosphor is dried in an oven at 100° C. in air for about 4 hours. The dried zinc silicate phosphor is then suspended as a part of an aqueous envelope coating paint which includes 75.0 wt.% of hydroxyethyl cellulose binder material, 6.2 wt.% of separated zinc silicate phosphor, 17.8 wt.% of yttrium oxide phosphor, and 1.0 wt.% of strontium chloroapatite phosphor. The coating paint is applied to the interior of the envelope by flowing the paint over the inner surface of the envelope. The aqueous vehicle and the residual binder material are then volatized by placing the envelope in a conveyor type drying oven having a temperature of about 685° C. for about one minute. This leaves the phosphors as a homogeneous layer 16 adhered to the envelope interior surface. Completion of the lamp fabrication is then carried out by conventional steps.

It has been found that by not water washing the acid washed and separated zinc silicate phosphor, much better performance is obtained as compared to a phosphor that has been further washed with water. Apparently, the organic acid coats the zinc silicate phosphor material, providing protection for the phosphor from certain elements such as sodium, iron and molybdenum that may have a deleterious effect on the performance of the phosphor.

What we claim is:

1. The method of improving the long-term operating appearance of a low-pressure fluorescent discharge lamp of the type which incorporates a phosphor layer on the envelope interior surface which essentially consists of a mixed homogeneous three-component phosphor blend, said phosphor blend having a red-orange-emitting phosphor component, a blue-violet-emitting phosphor component, and a green-emitting phosphor component, wherein said greenemitting phosphor component is manganese-activated zinc silicate, said lamp having an elongated tubular lighttransmitting vitreous envelope with said homogeneous blend carried as a coating on the interior surface thereof, electrodes operatively positioned proximate the enevelope ends, and a discharge-sustaining filling comprising mercury and inert ionizable starting gas enclosed by said envelope, said method comprising:

a. treating or conditioning the zinc silicate phosphor prior to blending said zinc silicate phosphor with said blue-violet-emitting phosphor and said red-orange-emitting phosphor, by washing said zinc silicate phosphor in an aqueous organic acid solution, wherein said organic acid consists of at least one of acetic, succinic and terephthalic;
   b. separating said acid washed zinc silicate phosphor from said acid washing solution;
   c. drying said separated zinc silicate phosphor without further water washing of same;
   d. suspending as a part of an aqueous envelope coating paint which includes suitable binder material, said separated zinc silicate phosphor, said red-orange-emitting phosphor, and said blue-violet-emitting phosphor, with the relative proportions of said phosphors being those as desired in the completed lamp;
   e. applying the coating paint to the envelope interior surface, thereafter volatilizing aqueous vehicle and residual binder material from the applied paint, leaving the phosphor blend as a homogeneous layer on the envelope interior surface, and thereafter completing the lamp fabrication.

2. The method of claim 1, wherein said aqueous organic acid solution has a molarity from about 0.09 to 1.05.

3. The method of claim 2, wherein said acid solution is an acetic acid solution.

4. The method of claim 2, wherein said acid solution is a succinic acid solution.

5. The method of claim 2, wherein said acid solution is a terephthalic acid solution.

* * * * *